United States Patent [19]

Kemppainen

[11] 4,432,570
[45] Feb. 21, 1984

[54] COUPLING

[76] Inventor: Gunnar Kemppainen, Adolf Hedinsvagen 11, 981 34 Kiruna, Sweden

[21] Appl. No.: 277,500

[22] Filed: Jun. 26, 1981

[30] Foreign Application Priority Data

Jun. 27, 1980 [SE] Sweden .................................. 8004786

[51] Int. Cl.³ ............................................. F16L 35/00
[52] U.S. Cl. ....................................... 285/24; 285/38; 285/39; 285/175; 285/276; 285/317; 285/349; 285/355; 285/369
[58] Field of Search ...................... 285/34, 276, 38, 39, 285/349, 24, 27, 317, 175, 174, 355, 369

[56] References Cited

U.S. PATENT DOCUMENTS 2,645,506  7/1953  Stryis ................................ 285/34 X
3,108,825  10/1963  MacDonald ..................... 285/175 X
4,211,438  7/1980  Asberg ............................. 285/174 X

FOREIGN PATENT DOCUMENTS 340918  6/1971  Sweden ................................ 285/39

Primary Examiner—Dave W. Arola
Attorney, Agent, or Firm—William A. Drucker

[57] ABSTRACT

A coupling comprises a sleeve shaped member (5) which has an external toothing (11), an internal threading (12) and also a tubular guiding portion (13). An annular member (14) surrounding the toothing (11) is rotatably mounted over the sleeve shaped member (5) and has a handle (28) and a reversible catch (22) to engage the toothing. A coupling member (29) to be threadingly connected to the sleeve shaped member (5) has for that purpose an external threading (30) as well as a saw tooth shaped, peripheral bead (31) to obtain a guide function by cooperation with the tubular guiding portion (13). A further coupling member (1) is rotatably but non-displaceably connected to the sleeve shaped member (5) and has in the end surface thereof a groove (3) having a dovetail section and an O-ring (4) inserted thereinto.

3 Claims, 1 Drawing Figure

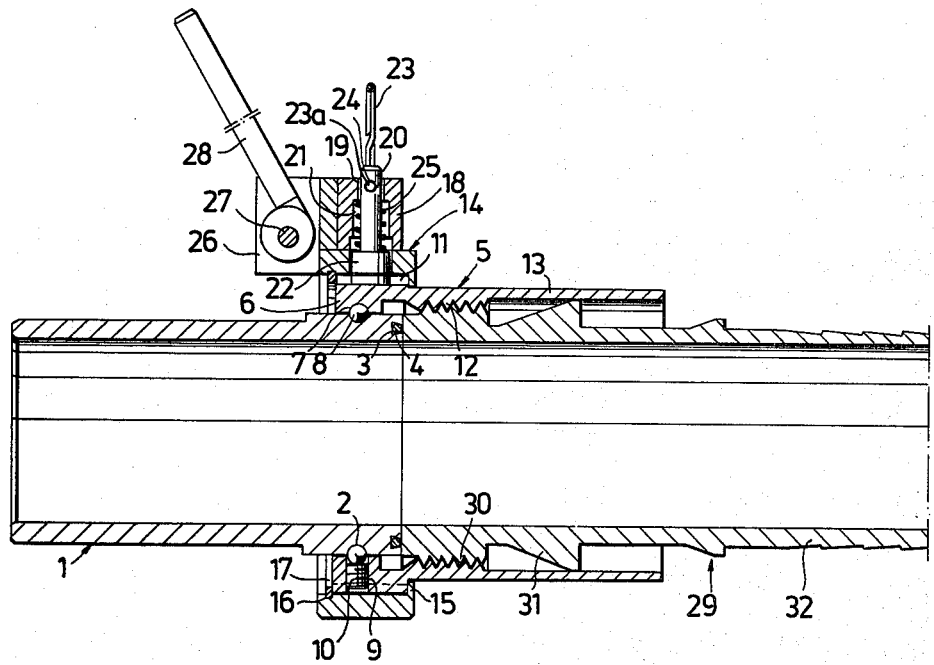

COUPLING

The present invention relates to a coupling.

PRIOR ART

A hose coupling previously described in the Swedish Pat. No. 340.918 comprises two coupling members connectable to each other by means of threading whereby one of the members has an external toothing and also a guide means for a plate rotatably mounted in relation to said coupling member, said plate having a guiding means for a catch member to cooperate with the toothing of the coupling member such that said coupling members may be threaded into and out of engagement with each other respectively, by means of a reciprocating movement of the plate which for said purpose has a handle.

The second coupling member, usually designed as a hose nipple, has to be manually inserted in the first mentioned coupling member by means of a rotary movement.

In said known coupling there is used a sealing ring which is housed in a groove in the first mentioned coupling member and engaging an end portion of a hose nipple and may be easily damaged in case the nipple is not fixed axially.

Such a hose coupling has however proved satisfactory when designed for relatively small dimensions and if the pressure in the hose is not too high. However, when it comes to larger and more difficult to handle hoses and high pressures on the medium intended to flow through the hose, it has been observed that the manual insertion of the second coupling member may not be accomplished without great difficulty, and at the same time it is hard to obtain a sufficient sealing action and to prevent disturbances resulting from particles that may penetrate into the parts of the structure. A risk for squeezing damages also prevails.

OBJECT OF THE INVENTION

The primary object of the present invention is therefore to eliminate said and other disadvantages and to create a hose coupling that may be used also for the largest hose dimensions and using pressures in the order of 250 kg/cm$^2$.

SUMMARY OF THE INVENTION

To accomplish this and other objects of the invention has the characteristics disclosed in the appended claims.

BRIEF DESCRIPTION OF THE DRAWINGS

The accompanying drawing illustrates an exemplifying embodiment of the invention and the sole FIGURE shows a longitudinal sectional view through the new hose coupling.

DESCRIPTION OF THE PREFERRED EMBODIMENT

In the drawing reference numeral 1 generally designates one of the coupling members. This member is tubular and, as may be seen in the drawing, has a greater wall thickness in one end thereof. Said coupling member may be attached to an apparatus or may form a hose nipple. In the thickened, right hand portion of the coupling member 1 there is provided a peripheral groove 2 of semi-circular sectional shape and the end surface thereof has a peripheral groove having a dovetail section 3 and an O-ring 4 fitted thereinto.

A second coupling member is designated by reference numeral 5 and similarly to the member just described, has a tubular shape and an end portion 6 of a larger wall thickness than the connecting portion of the coupling member. The coupling member 5 has an internal peripheral groove 7 in said larger portion, which groove has a semi-circular sectional shape, and as may be seen said grooves 2 and 7 define a guide means for a plurality of steel balls 8 serving the purpose of axially fixing or securing the coupling members 1 and 5 in relation to each other, permitting a mutual rotational movement with slight frictional resistance. The coupling member 5 has an insertion hole 9 for the insertion of the balls normally kept closed by a threaded plug 10. The second coupling member 5 has, in the thickened portion thereof, an external circular toothing 11 and has an internal threading 12 in the weaker portion thereof to merge in a relatively thin walled tubular sleeve section 13.

An annular member 14 has an inwardly directed flange 15 in one end thereof engaging the corresponding end surface of the larger portion 6 of the coupling member 5 and has an internal groove 16 in the opposite end thereof and a locking ring 17 fitted into said groove 16 and said ring acts upon the larger section 6 of the coupling member 5 to axially fix or secure the annular member in relation to the coupling member 1. A sleeve 18 is welded to the annular member 14 having a more narrow bore 19 to guide a pin 20 and a bigger hole 21, which also passes through the member 14 to guide a part 22 of the pin 20 shaped as a catch or latching tooth. A grip lug 23 is secured to the portion of the pin 20 which projects from the sleeve 18 and a transverse portion 23a of said lug in the illustrated position engages a groove 24 provided in the upper end surface of sleeve 18. A helical spring 25 is housed in the bore 21 and one end thereof rests against the wall separating the holes 19,21 from each other and the opposite end thereof engages the latching tooth or catch 22. Two lugs 26 project from the sleeve in the lateral direction and a pivot pin 27 extends between said lugs to pivotally connect a handle 28 to the sleeve.

Further, the hose coupling has a second tubular coupling member 29 having a larger end portion provided with an external threading 30 to engage the threading 12 of the coupling member 5. Further, a part 31 of substantially saw tooth shaped section projects from a portion having a reduced wall thickness which in turn extends from the threading 30, and said part 31 continues in a thinner part which forms a hose nipple 32.

The hose coupling described operates in the following manner:

In the initial position, the members 1, 5 and 14 including the parts thereof form a unit. The hose to be connected to said unit is applied over the part 32 of coupling member 29 and is fixed to said part, when so required, by means of a hose clip or a similar element. By inserting the coupling member 29 in the sleeve shaped portion 13 of the coupling member 5 and reciprocating the handle in a plane perpendicular to the plane of the illustration, the connection between members 1 and 29 is accomplished. To obtain such a result the latching tooth or catch is so oriented, that it carries with it the coupling member 5 when moved in one turning direction owing to the fact that the catch latchingly engages the teeth 11. When moving the handle in the opposite direction the latching tooth will instead slide over the teeth 11. At the end of this movement the O-ring 4 engages one of the end surfaces of member 29 and is thereupon somewhat compressed such that an efficient sealing action is obtained between the members 1 and 29. In this position the coupling action is accomplished and an extremely reliable sealing connection created between members 1 and 29.

When it is desired to dis-assemble the coupling the lug 23 is seized and with the aid thereof the latching tooth 22 or catch is brought out of engagement with the teeth 11. By turning said tooth or catch 180° by means of the lug, the latching tooth or catch has become oppositely oriented and said position is maintained as the portion 23a of the lug 23 is housed within the groove 24 as soon as the lug is released. This is of course accomplished by the spring 25. Again, by operating the handle, the member 29 will be threaded out of the member 5 and a disconnection thus has been carried out.

Owing to the construction now described, the toothing is made fully encapsulated and the risk for operational disturbances caused by penetrating particles is considerably reduced and at the same time the risk for squeezing damages to the operator is also minimized. The sleeve shaped portion 13 of the coupling member 5 further serves the purpose of protecting the threadings 12 and 30 but primarily it permits in combination with the peripheral annular portion 31 of substantially saw toothed shaped section, that the member 29 may be introduced in the member 5 in an extremely simple manner. The member 29 is then so effectively guided that the threadings 30 directly will be located in a position for engagement with the threadings 12 of the coupling member 5, and thus, the handle may, immediately after the introduction, be operated to accomplish the threading engagement. Thus the power consuming step of manually initiating the threading is eliminated. Of decisive importance is further that the sealing member 4 is continuously fixed in relation to the member 1 and as close to the inner surface of the coupling as possible resulting in the advantage that the sealing member cannot be damaged and that the sealing will be so effective that the coupling will seal also when exposed to very high pressures.

Owing to the fact that the coupling member 1 may be rotated with a very low friction resistance, the operation thereof is also facilitated and at the same time the sealing member is exposed for a minimal wear during the coupling actions. Further, the coupling will have an attractive appearance and occupies a small amount of space as the handle 28 may be downwardly folded towards the member 1 when not used for connection and disconnecting purposes, respectively.

I claim:

1. A coupling, comprising a first coupling member having a circular toothed portion on the exterior thereof and a second coupling member positioned over said first coupling member and having catch means thereon, said toothed portion cooperating with said catch means of said second coupling member, said first and second coupling members having means therebetween rotatably mounting said second coupling member on and in relation to said first coupling member to permit rotation of the first coupling member by rotating said second coupling member in a circular reciprocating movement, said catch means being reversible such that in a first position thereof it will be engaging the teeth of the toothing to cause said first coupling member to rotate with the second coupling member when rotated in a clockwise direction and to slide over the teeth thereof when rotated in a counter-clockwise direction and in a second position thereof it will cause said first coupling member to rotate with the second coupling member when rotated in a counter-clockwise direction and to slide over the teeth thereof when rotated in a clockwise direction, characterized in that the second coupling member surrounds the toothed portion of the first coupling member, said first coupling member including an elongated sleeve portion extending from said toothed portion and including an internal threading and a smooth cylindrical interior portion extending therefrom to the end thereof, a third coupling member having a substantially smooth tubular exterior guiding portion, and said third coupling member having a threading near to one end thereof threadingly engaging the threading of said first coupling member and at a somewhat larger distance from said end having said guiding portion which includes a substantially saw tooth shaped peripheral part, the outer peripheral portion of which closely fits in the cylindrical interior portion of said tubular sleeve to guide said threadings into engagement whereupon said third member is advanced or retracted in said first member by rotation thereof by said second member.

2. A coupling, according to claim 1, further including a fourth coupling member, and means between said first and said fourth coupling member rotatably but not displaceably mounting said fourth coupling member to the first coupling member, and wherein one of said fourth and third coupling member in one end surface thereof has an annular groove with a substantially dovetail shaped section, a sealing member, preferably an O-ring, being fitted in said groove.

3. A coupling, according to claim 2, wherein the means between said first and the fourth coupling member includes peripheral grooves therein which together define a peripheral groove of circular section, and wherein a plurality of balls are provided in said groove such that the coupling members become axially fixed in relation to each other whilst being easy to rotate in relation to each other.

* * * * *